Dec. 15, 1936.  W. C. McWHIRTER  2,064,439
CABINET
Filed Dec. 28, 1934   3 Sheets-Sheet 1

INVENTOR
William C. McWhirter.
BY
HIS ATTORNEY

Dec. 15, 1936.   W. C. McWHIRTER   2,064,439
CABINET
Filed Dec. 28, 1934   3 Sheets-Sheet 2
Fig. 4.
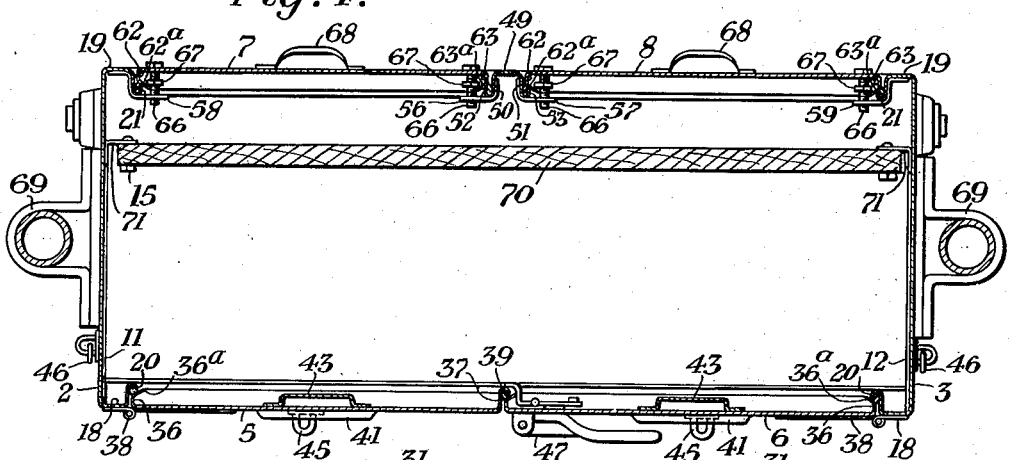
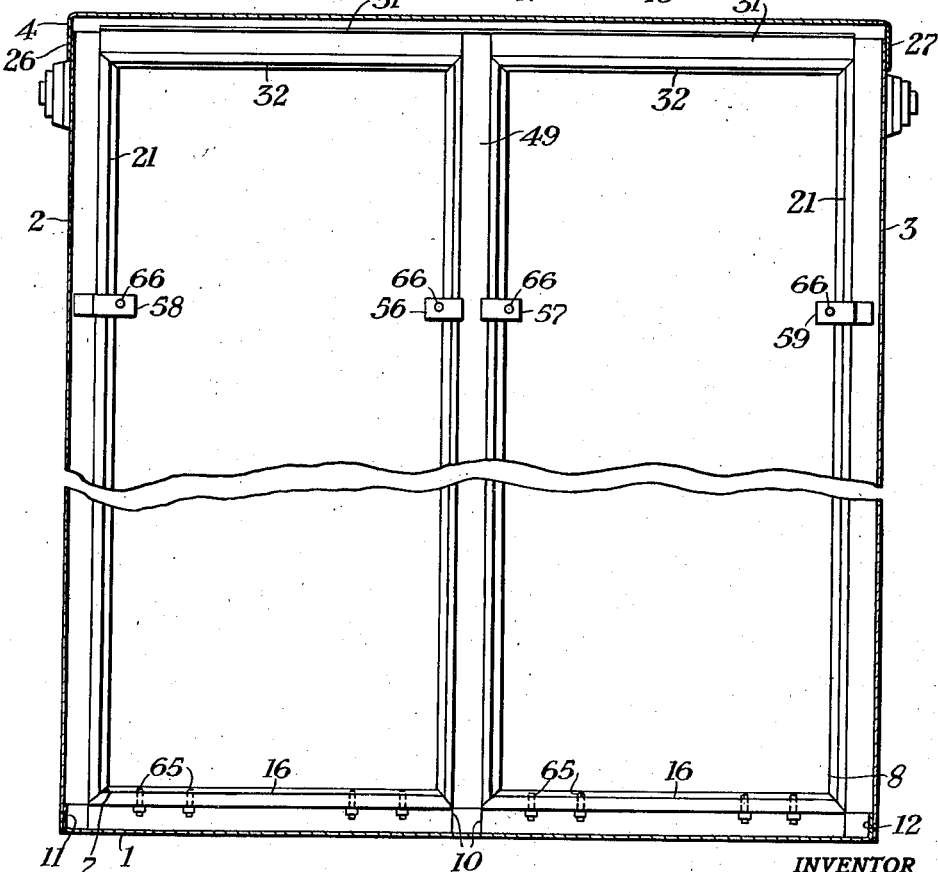
Fig. 5.
INVENTOR
William C. McWhirter.
BY
HIS ATTORNEY Dec. 15, 1936.  W. C. McWHIRTER  2,064,439
CABINET
Filed Dec. 28, 1934   3 Sheets-Sheet 3

INVENTOR
William C. McWhirter.
BY
HIS   ATTORNEY

Patented Dec. 15, 1936

2,064,439

UNITED STATES PATENT OFFICE 2,064,439

CABINET

William C. McWhirter, Wilkinsburg, Pa., assignor to The Union Switch & Signal Company, Swissvale, Pa., a corporation of Pennsylvania Application December 28, 1934, Serial No. 759,546

4 Claims. (Cl. 312—141)

My invention relates to cabinets, and particularly to pressed steel cabinets.

One object of my invention is to provide an inexpensive cabinet of the type described which is particularly suitable for, although not limited to, use in connection with railway signaling systems to house the relays, batteries, and the like employed in such systems.

I will describe one form of cabinet embodying my invention, and will then point out the novel features thereof in claims.

Figure 1:
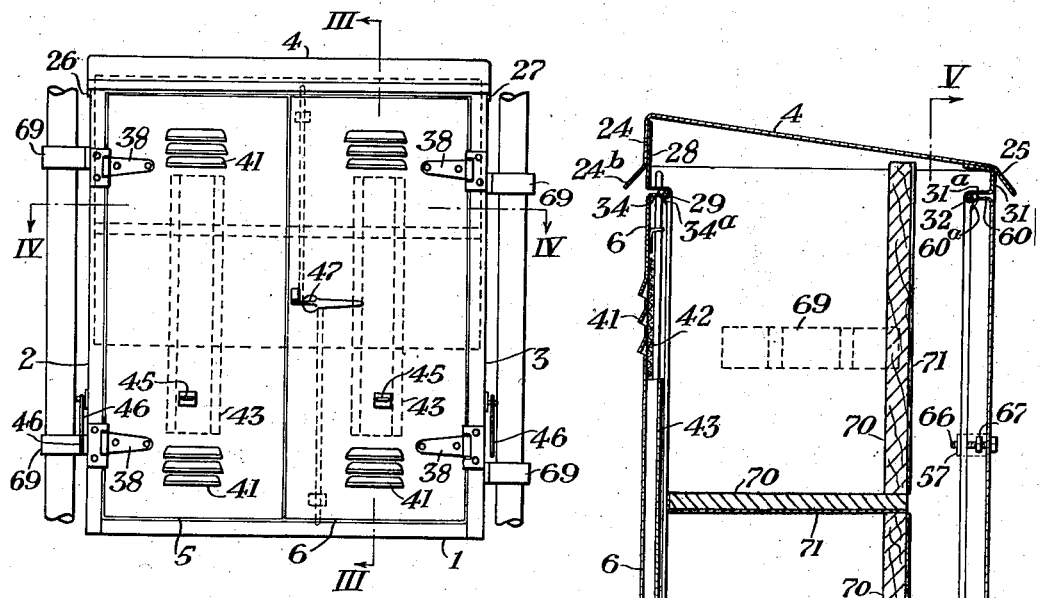
Figures 2, 3:
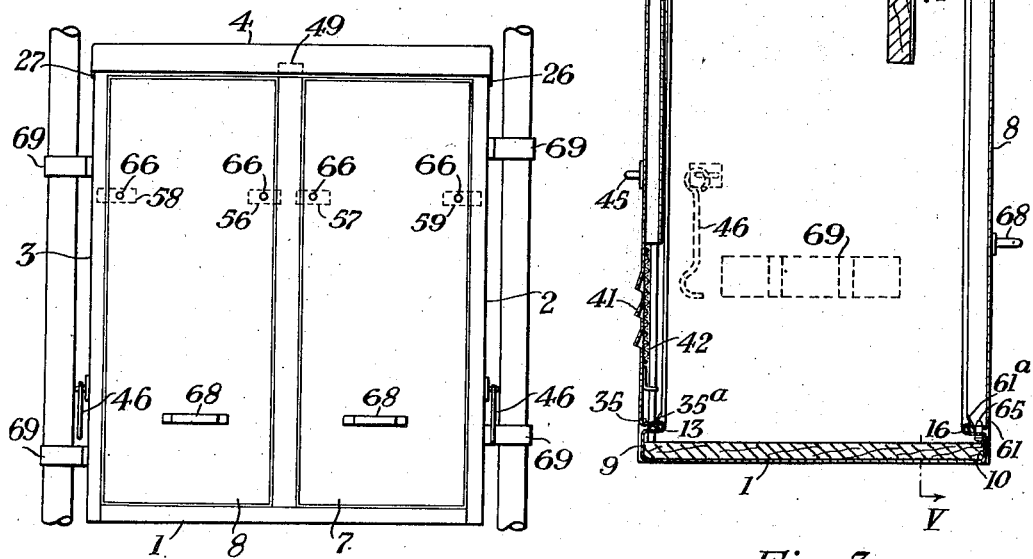
Figure 6:
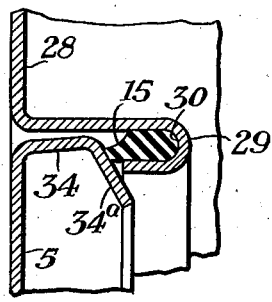
Figure 8:
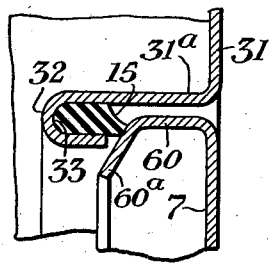
Figure 10:
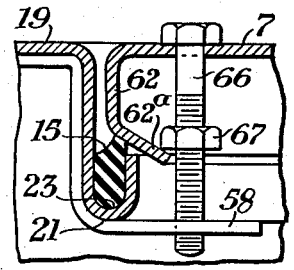

In the accompanying drawings, Fig. 1 is a front elevational view showing one form of cabinet embodying my invention. Fig. 2 is a back view of the cabinet shown in Fig. 1. Figs. 3 and 4 are enlarged sectional views taken on the lines III—III and IV—IV, respectively, of Fig. 1. Fig. 5 is an enlarged sectional view taken on the line V—V of Fig. 3. Figs. 6 to 15, inclusive, are enlarged sectional detail views showing the construction of various portions of the cabinet.

Similar reference characters refer to similar parts in each of the several views.

Referring to the drawings, the cabinet comprises in general, a base 1, end walls 2 and 3, a top 4, front doors 5 and 6, and back panels 7 and 8.

Figure 7:
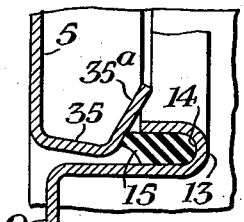
Figure 9:
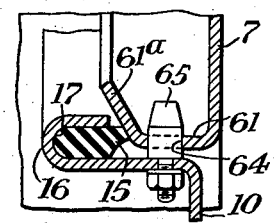

As best seen in Figs. 3, 4 and 5, the base 1 is pressed from a single sheet of steel and is of shallow box-like construction having a front flange 9, a two-part rear flange 10, and end flanges 11 and 12. The front flange 9 is provided at its upper end with a U-shaped return bend 13 which, as shown in Fig. 7, forms an outwardly facing groove 14, and cemented or otherwise fastened in this groove is a strip 15 of packing which cooperates, in a manner which will be described more fully hereinafter, with the bottoms of the front doors 5 and 6 to prevent dirt and moisture from entering the cabinet. Both parts of the rear flange 10 of the base 1 are likewise provided at their upper ends with a U-shaped return bend 16 similar to the bend 13 which is provided in the front flange 9, which latter bends each form an outwardly facing groove 17 (see Fig. 9) for the reception of packing 15 which cooperates with the bottom of the back panels 7 and 8 to prevent dirt and moisture from entering the cabinet. Each end of each return bend 16 is mitered, as shown in Fig. 5, so that when matched with similar miters and grooves on the end walls 2 and 3, which miters and grooves I will describe presently, a continuous groove for the reception of packing is provided at the corners where the mitered ends meet.

The two end walls 2 and 3 are similar and a description of one will therefore suffice for both. Referring particularly to the end wall 2, this end wall is of one piece U-shaped construction (see Figs. 4 and 5) having side flanges 18 and 19 provided with U-shaped return bends 20 and 21, respectively, (see Figs. 11 and 10) forming outwardly facing grooves 22 and 23 for the reception of packing 15. The ends of the U-shaped return bends are mitered for the reasons which were pointed out in the preceding paragraph. The end walls 2 and 3 are welded at their lower ends to the side flanges 11 and 12, respectively, of the base 1.

The top 4 (see Fig. 3) is of shallow box-like construction having a depending forward flange 24, a depending rear flange 25, and side flanges 26 and 27. The forward flange 24 is vertically disposed at its upper end and is provided at its lower end with an integral angularly disposed outwardly extending portion 24ᵇ. The two side flanges 26 and 27 are welded respectively to the upper ends of the end walls 2 and 3 (see Fig. 5). An L-shaped section 28 is welded to the rear side of the vertically disposed portion of the forward flange 24 of the top 4, and the lower part of this section is formed with a U-shaped return bend 29 forming a groove 30 (see Fig. 6) for the reception of packing 15 which cooperates with the upper ends of the doors 5 and 6 to prevent the entry of dirt and moisture into the cabinet. Two substantially U-shaped sections 31 are also welded to the top 4 adjacent the rear flange 25 (see Figs. 3 and 5), and the lower horizontal leg 31ᵃ of each of these sections is formed with a U-shaped return bend 32 forming an outwardly facing groove 33 (see Fig. 8) for the reception of packing 15 which cooperates with the back panels 7 and 8 at their upper ends to prevent the entrance of dirt and moisture into the cabinet.

Figure 11:
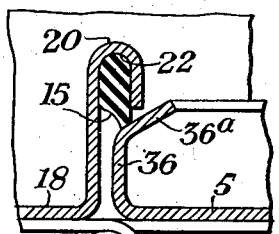
Figure 12:
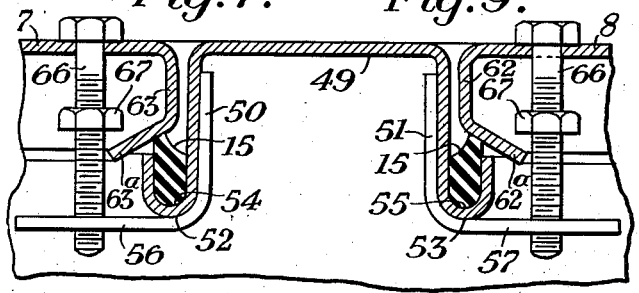
Figure 14:
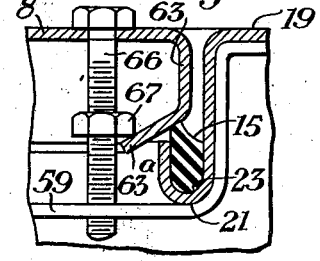
Figure 13:
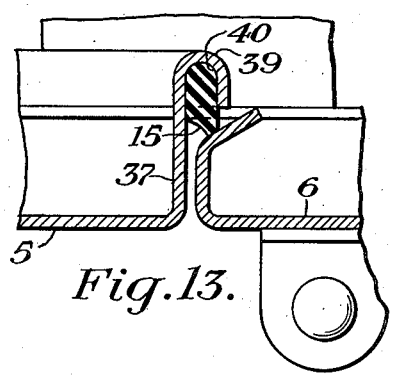
Figure 15:
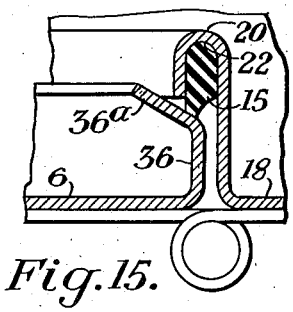

The front door 5 is also of shallow box-like construction, and is provided with top and bottom flanges 34 and 35 (see Figs. 3, 6 and 7) and with side flanges 36 and 37 (see Figs. 4, 11 and 13). The door is fastened to the flange 18 of the end wall 2 by means of hinges 38 which are spot welded to the door and to the flanges. The top and bottom flanges 34 and 35 are provided at their inner ends with angularly disposed portions 34ᵃ and 35ᵃ (see Figs. 6 and 7) which, when the door is closed, engage the packing 15 in the grooves 30 and 14. The side flange 36 is likewise provided at its inner end with an angularly disposed portion 36ª which cooperates with the packing 15 in the groove 22 in the end wall 2 when the door is closed, while the side flange 37 is provided at its inner end with a U-shaped return bend 39 forming an outwardly facing groove 40 (see Fig. 13) for the reception of packing 15 which cooperates with the other front door 6 to prevent moisture and dirt from entering the cabinet when the two doors 5 and 6 are closed.

Ventilating louvers 41 are provided in the door 5 at the top and bottom of the door near the central portion thereof, and fine mesh screens similar to the screens 42 shown in Fig. 3 are secured to the rear face of the door in back of these louvers to prevent dust and insects from entering the cabinet at the louvers. To strengthen the door and to add rigidity to it, a strengthening member 43 is welded to the rear face of the door. A staple 45 is secured to the outer face of the door directly above the lower louvers 41, and this staple cooperates with a hook 46 which is secured to the end wall 2 of the cabinet, to enable the door to be fastened in its open position.

The front door 6 is secured to the side flange 18 of the end wall 3 by means of hinges 38 which are welded to the door and to the side flange. This latter door is similar to the door 5 with the exception that the side flange of the door 6 which is adjacent to the door 5, instead of being provided at its inner end with a U-shaped return bend forming a groove for the reception of packing, is provided at its inner end with an angularly disposed portion (see Fig. 13) which cooperates with the packing disposed in the groove 40 in the door 5. Secured to the door 6 is a well known form of latching device 47 by means of which the two doors 5 and 6 may be latched in their closed positions. This latching device forms no part of my present invention, except in so far as it is used in combination with the other parts, and it is deemed unnecessary therefore to describe it in detail.

A substantially U-shaped vertical channel upright 49 having side flanges 50 and 51 (see Figs. 4 and 12) provided with U-shaped return bends 52 and 53 forming outwardly facing grooves 54 and 55 for the reception of packing 15, is welded at its lower end to the rear flange 10 of the base 1 at the junctions of the two parts of this flange, and at its upper ends to the substantially U-shaped section 31 forming part of the top 4. Two angle brackets 56 and 57 are welded to the flanges 50 and 51 of the upright 49, and each angle bracket is provided in one leg with a threaded hole for the reception of a machine screw, as will appear more fully hereinafter. Two other angle brackets 58 and 59 (see Figs. 4, 5, 10 and 14) are secured to the side flanges 19 of the end walls 2 and 3 in line with the brackets 56 and 57.

The two back panels 7 and 8 are also of hollow box-like construction, and each is provided with top and bottom flanges 60 and 61 (see Figs. 3, 8 and 9), and with side flanges 62 and 63 (see Fig. 4). Each flange is bent at its inner end to form an angularly disposed portion designated by the same reference character as the reference character for the associated flange with a distinguishing exponent. The panels are removable, and for the purpose of conveniently securing the panels to the cabinet the bottom flange 61 of each panel is provided with spaced holes 64 (see Fig. 9), which holes fit over the upper ends of vertical pins 65 which are secured to the base 1. Furthermore, each panel is provided with screws 66 which extend through clearance holes in the panel, and which are adapted to be screwed into the threaded hole in an associated one of the angle brackets 56, 57, 58 and 59. Secured to each screw 66 is a nut 67 which prevents the associated screw from falling out of the associated clearance hole when the panel is removed from the cabinet. To assist in removing the panels, handles 68 are welded to the panels. When the panel 7 is secured in place, the angularly disposed portions 60ª, 61ª, 62ª and 63ª engage respectively the packing 15 in the grooves 33, 17, 23 and 54. In a similar manner, when the panel 8 is secured in place, the angularly disposed portions 60ª, 61ª, 62ª and 63ª of this panel engage respectively the packing 15 in the grooves 33, 17, 23 and 55.

As shown in the various detail views, the packing 15 is formed with its inner portion rounded to fit the grooves formed by the associated U-shaped return bends provided in the various members of the case, and with its outer portion of angular construction so designed that the angular portions of the various flanges of the cabinet which cooperate with the packing will engage only a narrow edge of the packing. The packing is of pliable material, such as rubber, and is preferably cemented in place by suitable cement. The combination of the angular disposed portions on the various flanges of the case with the comparatively thin section of packing which these flanges engage results in a reliable, easily compressed, weather-proof joint. The large area of packing which engages the groove in which the packing is cemented compared to the narrow section of the packing which engages the angularly disposed portion of the associated flange to form the weather-proof joint, results in a durable and reliable method of holding the packing in place without the use of rivets or similar fastening devices.

The cabinet is intended to be supported between two upright poles in the manner indicated, and for the purpose of securing the cabinet to the poles, straps 69, which are adapted to surround the poles are secured to the end walls 2 and 3 of the cabinet in an obvious manner.

The interior of the cabinet may be provided with any suitable means for supporting the relays and other devices which the cabinet is intended to house, the particular means here shown comprising wooden members 70 bolted to steel supporting members 71 which, in turn, are welded to the end members 2 and 3 of the cabinet in a manner which is obvious from an inspection of the drawings.

One advantage of a cabinet embodying my invention is that the base, ends, top, doors, etc., are all designed to facilitate die formation with a minimum number of parts.

Although I have herein shown and described only one form of cabinet embodying my invention, it is understood that various changes and modifications may be made therein within the scope of the appended claims without departing from the spirit and scope of my invention.

Having thus described my invention, what I claim is:

1. A pressed steel cabinet comprising a base having an upwardly extending forward flange provided with a U-shaped return bend forming an outwardly facing groove, end walls secured at their lower ends to said base and each provided at its forward edge with a flange having an integral U-shaped return bend which forms an outwardly facing groove, a top secured to the upper ends of said end walls and provided at its forward side with a depending flange member having a U-shaped return bend forming an outwardly facing groove, packing disposed in each of said outwardly facing grooves, and front doors secured to said cabinet and each provided with inwardly extending flanges formed at their inner ends with angularly disposed portions which cooperate with said packing when the doors are closed, said packing being of pliable material and being angularly shaped in such manner that the angular portions on the flanges of the doors will engage only a narrow edge of the packing, thereby providing an easily compressed weatherproof joint.

2. A pressed steel cabinet comprising a base having an upwardly extending forward flange provided with a U-shaped return bend forming an outwardly facing groove, end walls secured at their lower ends to said base and each provided at its forward edge with a flange having an integral U-shaped return bend which forms an outwardly facing groove, a top secured to the upper ends of said end walls and provided at its forward side with a depending flange member having a U-shaped return bend forming an outwardly facing groove, packing disposed in each of said outwardly facing grooves, and front doors secured to said cabinet and each provided with inwardly extending flanges formed at their inner ends with angularly disposed portions which cooperate with said packing when the doors are closed, said packing being of rubber and being cemented in said grooves and having a rounded inner portion and an outer portion which is angularly shaped in such manner that the angular portion on the flanges of the doors will engage only a narrow edge of the angularly shaped portion of the packing, thereby providing an easily compressed weatherproof and dustproof joint.

3. A pressed steel cabinet comprising a base having an upwardly extending forward flange provided with a U-shaped return bend forming an outwardly facing groove, end walls secured at their lower ends to said base and each provided at its forward edge with a flange having an integral U-shaped return bend which forms an outwardly facing groove, a top secured to the upper ends of said end walls and provided at its forward side with a depending flange member having a U-shaped return bend forming an outwardly facing groove, packing disposed in each of said outwardly facing grooves, and front doors hinged to said end walls and each provided at the top, bottom, and side which is adjacent to the hinges with rearwardly extending flanges formed with angularly disposed portions which cooperate with said packing when the door is closed, the one door further being provided at the side which is contiguous to the adjacent side of the other door with an inwardly extending flange having an integral U-shaped return bend forming an outwardly facing groove and the other door having formed on the corresponding side with an inwardly extending flange having an integral angularly disposed portion, and packing in the groove in said one door cooperating with the angularly disposed portion in the adjacent flange in the other door, all said packing being of a resilient pliable material and having an outer portion which is so shaped that the angular portion on the doors engages only a narrow edge of the packing, thereby providing an easily compressed weatherproof and dustproof joint.

4. A pressed steel cabinet comprising a base having upwardly extending flanges at its rear edge and an upwardly extending flange at each end, each said rear flange being provided at its upper end with a U-shaped return bend forming an outwardly facing groove, end walls secured at their lower ends to the end flanges on said base and each provided at its rear side with an inwardly extending flange having at its inner end a U-shaped return bend forming an outwardly facing groove, a top secured to the upper ends of said end walls and provided at its rear side with a depending member provided at its lower end with a U-shaped return bend forming an outwardly facing groove, a vertical upright secured at its lower end to the rear flanges of said base and at its upper end to the depending member at the rear side of said top intermediate the ends of the cabinet and provided at each side with inwardly extending flanges forming outwardly facing U-shaped grooves, packing of resilient pliable material secured within each of said grooves, said packing being provided at its outer end with an angularly shaped portion which terminates in a relatively narrow edge, and two panels one removably secured to the back of said cabinet on each side of said vertical upright and each provided at each edge with an inwardly extending flange bent at its inner end to form an angularly disposed portion which cooperates with the packing in the contiguous grooves.

WILLIAM C. McWHIRTER.